United States Patent [19]
Smith

[11] 3,905,228
[45] Sept. 16, 1975

[54] MECHANICAL HEAT FLUX RECORDER

[75] Inventor: Warren K. Smith, Poway, Calif.

[73] Assignee: The United States of America as represented by the Secretary of the Navy, Washington, D.C.

[22] Filed: June 20, 1974

[21] Appl. No.: 481,088

[52] U.S. Cl. .............................................. 73/190 H
[51] Int. Cl.² ......................................... G01K 17/00
[58] Field of Search........ 73/15, 190 R, 190 H, 339, 73/363, 363.5

[56] References Cited
UNITED STATES PATENTS

| | | | |
|---|---|---|---|
| 3,526,865 | 9/1970 | Black | 73/363.5 |
| 3,712,131 | 1/1973 | Smith | 73/190 |

Primary Examiner—Herbert Goldstein
Attorney, Agent, or Firm—R. S. Sciascia; Roy Miller; Gerald F. Baker

[57] ABSTRACT

A mechanical heat flux recorder is provided which is based upon the shape recovery properties of a nickel-titanium alloy (NiTi). A pair of nickel-titanium strips are connected between a heat sink block enclosed in an asbestos lined metal box and respective exposed heat receivers. The heat receivers have calibration marks scribed around the edges and reference marks are provided on the box. The heat receivers are first turned not more than one revolution clockwise, for example, and set at an initial position indicating zero. This twisting operation plastically deforms the nickel-titanium metal strips. When the instrument is then exposed to a heat environment which is being investigated, the strips partially recover their original straight shape, and the dial readings after exposure are noted in conjunction with a prepared chart to find the heat flux in calories per centimeter squared per second or some other preferred units of measure. The instrument may then be re-set and re-used.

7 Claims, 7 Drawing Figures

TIME CALIBRATION CHART FOR
DIFFERENTIAL NITINOL HEAT FLUX INDICATOR
(TTR = 275°F)

TEMPERATURE GRADIENT VS NITINOL STRIP UNTWIST

HEAT RECEIVER CALIBRATION

3,905,228

MECHANICAL HEAT FLUX RECORDER

CROSS REFERENCE TO RELATED APPLICATIONS

A nickel titanium alloy usable in practicing the present invention is described in Assignee's Prior U.S. Pat. No. to W. J. Buehler et al, 3,403,238 and the disclosure therein is hereby incorporated by reference. A discussion of the background of heat flux sensors and recording devices may be found in applicant's prior application Ser. No. 117,473 now U.S. Pat. No. 3,712,131.

BACKGROUND OF THE INVENTION

The invention relates to a passive recording heat flux indicator and a method of using said indicator.

More particularly the present invention relates to the use of a nickel-titanium alloy in a heat flux sensing instrument.

The passive recording heat flux indicator described in applicant's prior U.S. Pat. No. 3,712,131 depends upon the use of two adjacent hardened steel heat receivers of different thicknesses. Exposure to a heating environment causes a difference in hardness due to different rates of temperature rise and different rates of tempering for the two heat receivers. Knowing these hardnesses and the tempering properties of the steel, it is possible to obtain the heat flux and the exposure time. Unfortunately, the sensitivity of this device was not good above about 1 CAL/cm$^2$ sec, and the hardness test required was not always convenient under the circumstances.

Another passive recording heat flux indicator is described by Y. Ono in a Masters Thesis at Oklahoma University in 1973; (to be published). The instrument described by Ono consists of a steel disc mounted flush in an insulated holder. A number of temperature-sensitive tabs are pasted on the back of the steel disc. These tabs have spots which turn black when their special temperature limits are exceeded. The tabs for a particular service are selected to cover a rather small range of temperature, as near as it can be estimated, in steps of a few degrees. After exposure the approximate maximum temperature of the steel disc can thus be ascertained and, if the exposure time is known, heat flux can be calculated.

SUMMARY OF THE INVENTION

According to the present invention a means of obtaining maximum temperatures can now be had by the use of Nitinol strips or wires as noted above. No special hardened steel receivers are needed, and, no hardness tests are needed either. Instead, the different thickness heat receivers are untreated ordinary steel shaped into similar dials. Before use, the dials are twisted about 360° and such that an index mark on each dial is opposite a reference mark on the container or housing. After exposure in a fire, the dial positions are read by holding a clean unsmoked plastic scale card, for example, in juxtaposition to the dials and the readings are noted and referred to calibration charts prepared for this purpose to obtain heat flux in CAL/cm$^2$ sec. and the exposure time in seconds. Alternatively the heat receivers may be scribed with dials as described below.

THE ALLOY NITINOL

William J. Buehler and others at the Naval Ordnance Laboratory, White Oak, Md., discovered the unique properties of near-stoichiometric combinations of nickel and titanium. This intermetallic compound transforms into a much stronger structure upon being heated through a temperature range as small as 15°F, the process being reversible. If the alloy is strained up to 8% prior to transforming to the higher temperature phase, it remembers its pre-strained shape and returns to it as it is heated through the transformation temperature range (TTR). The latter process is not reversible. The TTR temperature value quoted is the temperature above which transformation is complete.

The peculiar shape recovery behavior of 55-Nitinol (55.0 weight % of nickel) leads to a simple mechanism for indicating the maximum temperature of one end of a strip (or wire) of the metal when the other end is held at a constant ambient temperature. If the strip is twisted in torsion (not exceeding 8% outer fiber strain) before heating on the one end, the temperature gradient along the strip will cause the strip to untwist as far along as its TTR has been exceeded. Therefore, from the geometry of the system, the degree of untwist is directly related to the maximum temperature of the hot end. These properties of Nitinol have been used to advantage in the design of the passive heat flux indicator of the present invention.

DESCRIPTION AND OPERATION

Figure 1:
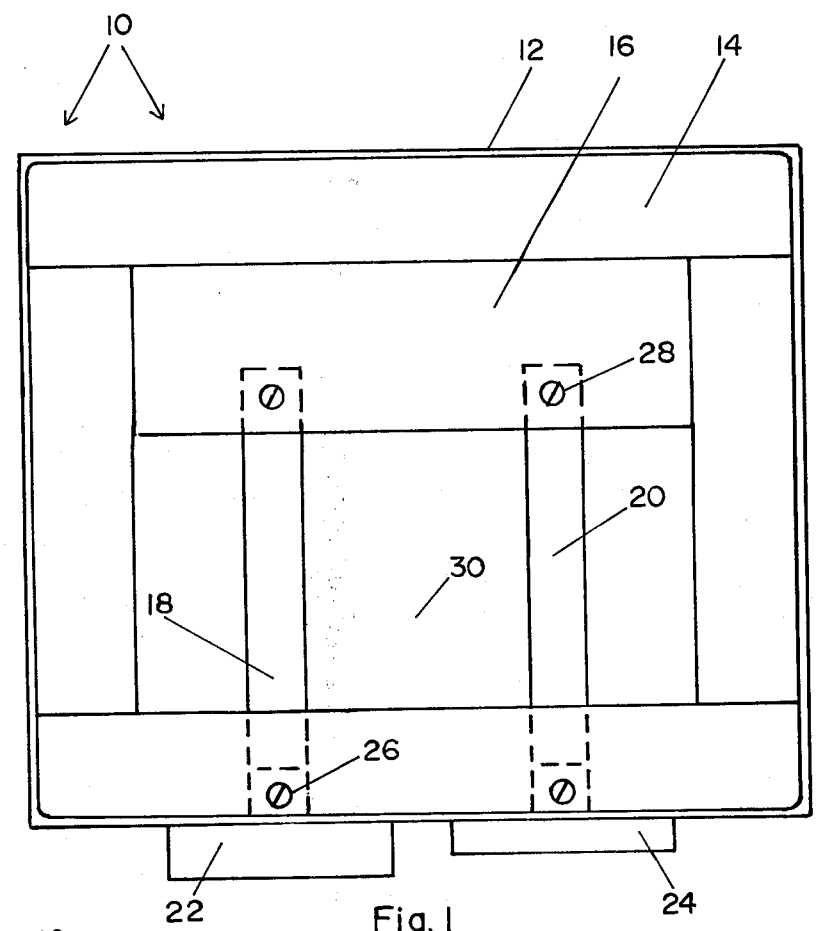
FIG. 1 is a top plan view of a heat flux indicator according to the invention with the top cover removed.

A mechanical heat flux recorder according to the present invention is shown generally at 10 in FIG. 1. The unit is shown housed in a metal box 12 lined with asbestos or other insulation material as indicated at 14.

In the metal box 12, surrounded by the insulation, is a heat sink 16 comprising a relatively massive block of aluminum or copper, for example. Two Nitinol strips 18, 20 extend from the heat sink 16 forwardly to the front of the box 12 where they are connected to two disc shaped heat receivers 22, 24 by means of screws 26. The Nitinol strips are preferably fastened into slots provided in the heat sink and held in place by screws 28. The space 30 between and around the Nitinol strips may also be filled with shredded asbestos or other finely divided insulation so that the heat sink and the Nitinol strips are completely surrounded by insulation.

Figure 2:
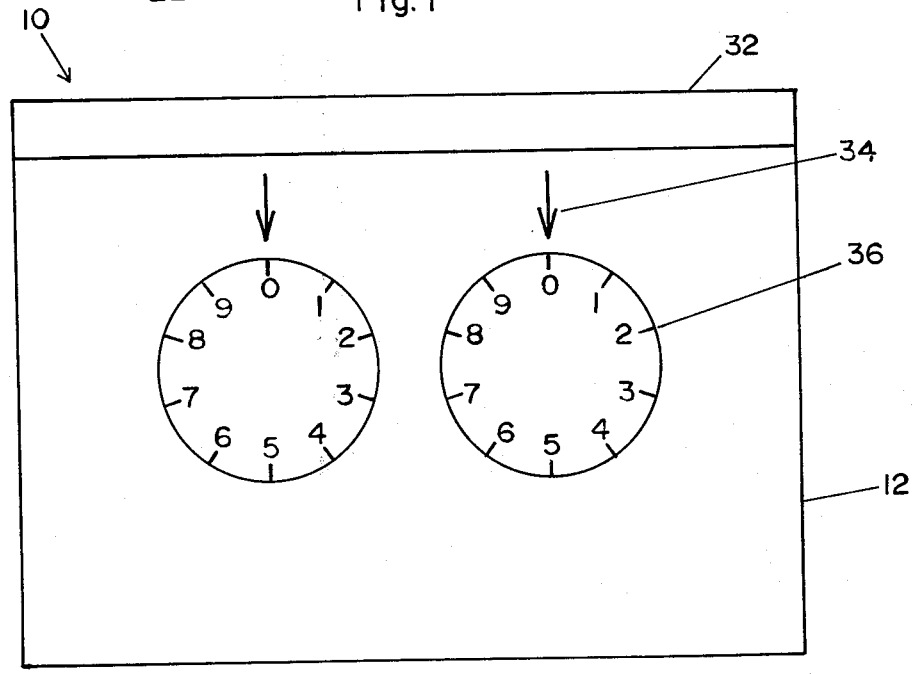
FIG. 2 is a front elevation of the device of FIG. 1.

As shown in FIG. 2, a metal cover 32 completes the housing of the unit. The front of the box is scribed with a reference mark or arrow 34 adjacent to each of the heat receivers. Each of the heat receivers is scribed with 11 equally spaced marks, one of which is designated as zero. The receivers are preferably recessed in and do not touch the metal frame of box 12 and may also be slightly recessed into the front block of insulation.

OPERATION

The device is prepared for use by twisting the dials approximately 360° so that the zero index mark on each dial is opposite the reference mark on the container. After exposure in a fire, the dial positions are read by placing a plastic scale card, for example, over the face of the container and the readings are then referred to charts prepared for this purpose to obtain heat flux in CAL/cm² sec and the exposure time in seconds. The calibration curves given in FIG. 3 chart are for Nitinol strips with a transformation temperature of 275°F. The FIG. 4 chart is used after the FIG. 3 chart in order to read off the exposure time. These charts are for ⅛ inch and 1/16 inch thick receiver dials, but charts have also been prepared for ¼ inch to ⅛ inch and 1/16 inch to 1/32 inch receiver dials.

The principle of the operation depends upon the memory of the Nitinol metal for its shape before twisting and its ability to return to that shape whenever its temperature is raised to or above its transformation temperature range which may be as narrow as 10°F and of any desired value between 100° and +300°F by varying the composition. In the present construction there tends to be established a straight line temperature gradient along the Nitinol strips between heat receivers 22 and 24 and heat sink block 16 which, because of its size, insulation, and small amount of heat conducted to it, remains near ambient temperature. The temperature gains in the two known masses of the heat receivers in the same time span makes possible the simultaneous solution of the heat balance equations to give both the heat flux and the exposure time. Experimental calibration is recommended before use, however, so that uncertain absorbences and heat losses are accounted for.

The instrument may be prepared for use again rather easily by removing the Nitinol strips from the heat sink and straightening them by application of heat. This can be done simply by running a lighted match along the partially untwisted Nitinol strips until they are straight again. After cooling and reassembly, the unit is again prepared for use by twisting the dials manually as described above.

HYBRID DESIGN

Figure 3:
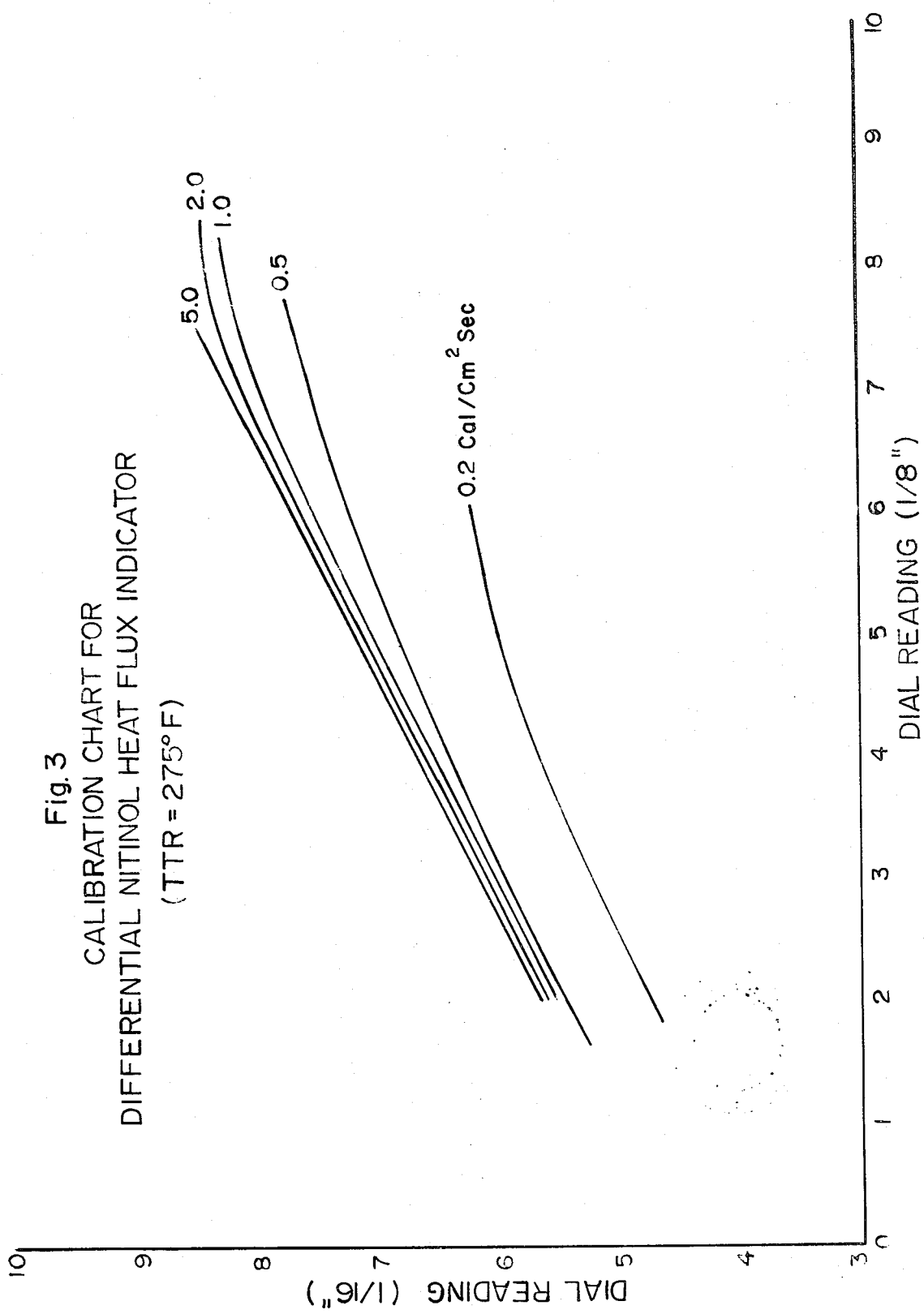
FIGS. 3 through 7 are empirical charts usable with the disclosed devices
Figure 4:
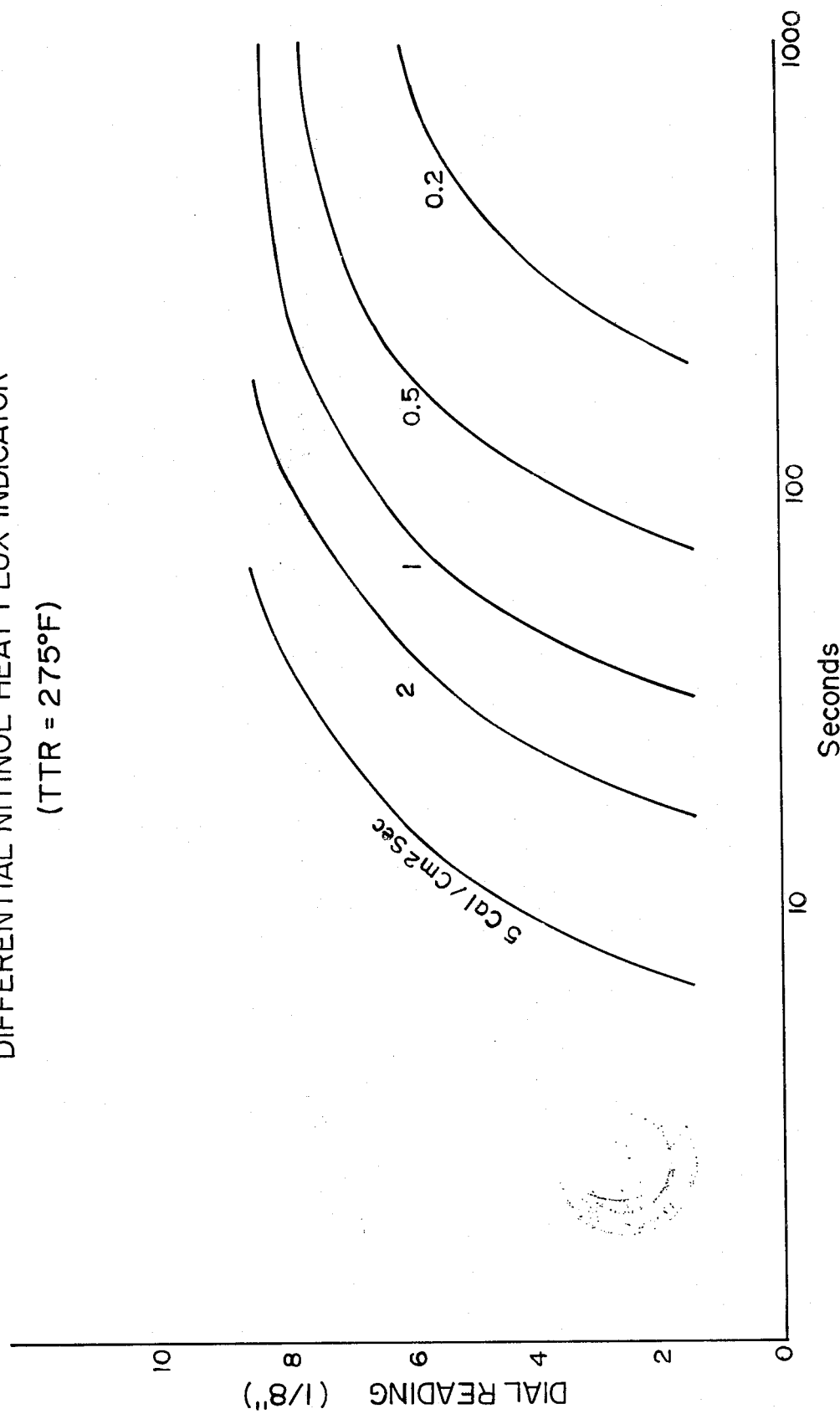

An inspection of FIG. 3 shows that the sensitivity of the differential instrument above 1 CAL/cm² sec is not much better than that of the device of applicant's prior U.S. Pat. No. 3,712,131, although it is more convenient to use, since hardness tests are not required. There are occasions, however, where a greater sensitivity or spread in the calibration curves is more desirable than the utmost in convenience, and a hardness test is then acceptable.

Figure 5:
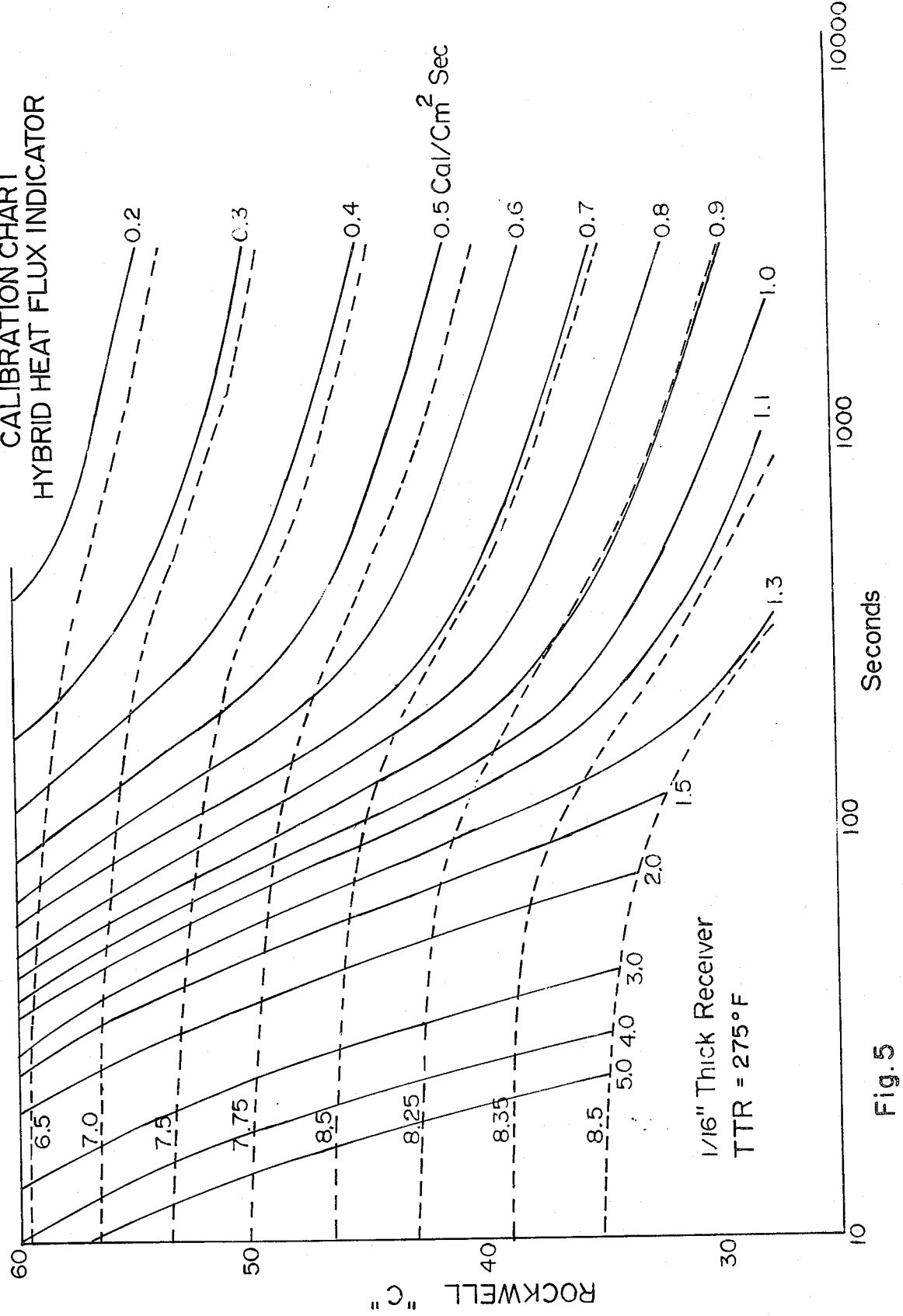
Figure 6:
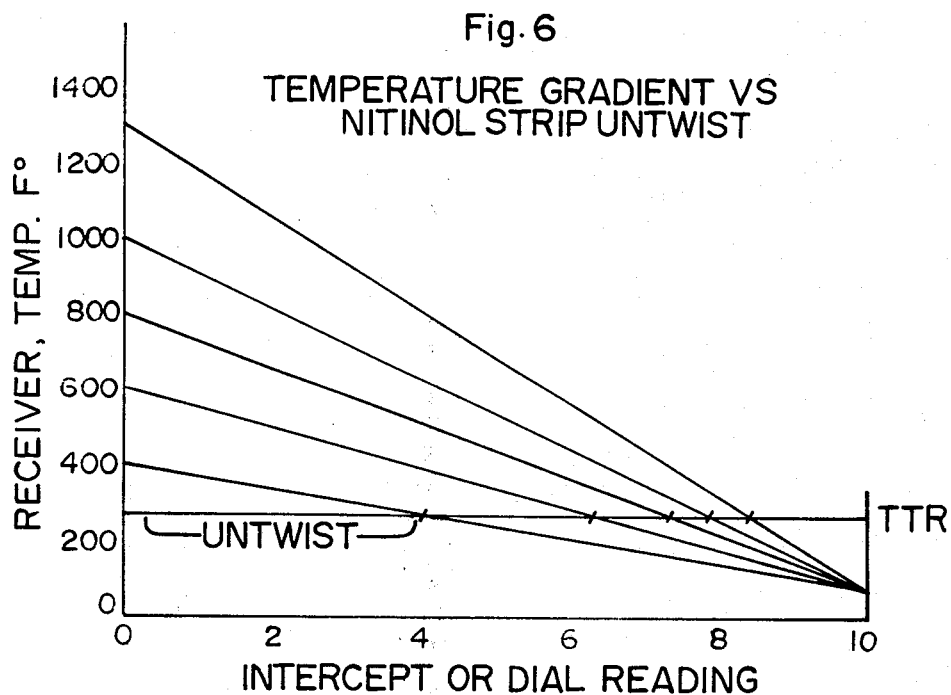
Figure 7:
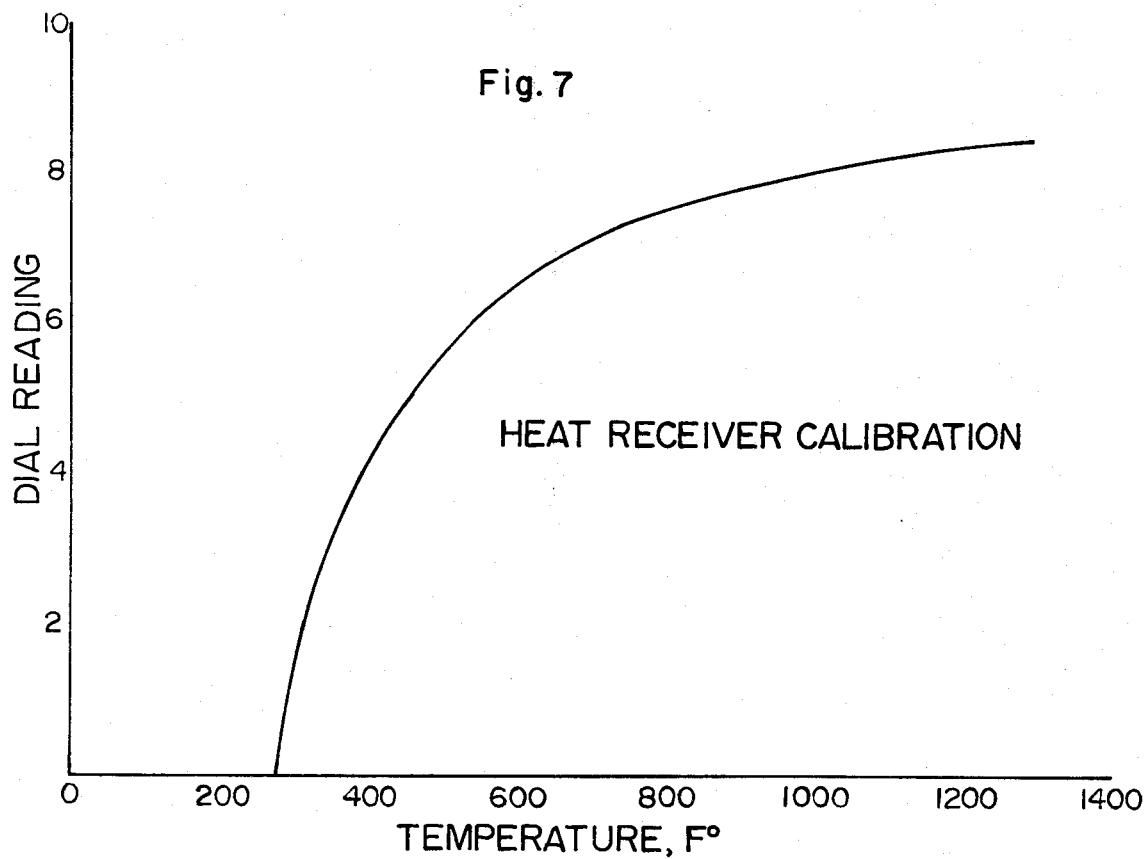

For this purpose, it is possible to combine the hardened steel heat flux indicator with the Nitinol type. The "hybrid" design results in much better sensitivity than either of the original types of heat flux indicator. It is only necessary to substitute heat receiver dials of fully hardened spring steel for the Nitinol type to make the hybrid model. Of course, a new calibration chart is needed for the hybrid design of heat flux indicator. The chart is derived by first calculating the temperature vs. time curves for each thickness receiver for various heat fluxes and then integrating numerically on the computer from the tempering curves for the steel. The steel should be AISI-1095, water quenched and tempered at 212°F for an hour to prevent cracking. As in the Nitinol type, small hubs with set screws should be provided for fastening the Nitinol strips. The hub plus the disc should equal the mass of metal required for a simple cylinder of the nominal thickness. Only one calibration chart needs to be prepared for each thickness of heat receiver dial, because time also can be shown on the same chart. FIG. 5 is an example of such a chart. It was prepared by superimposing dial reading curves (broken lines) vs. time curves (solid lines) for various heat fluxes on a chart from U.S. Pat. No. 3,712,131 (referenced above) of Rockwell "C" hardness of one thickness heat receiver vs. time for various heat fluxes. The dial reading vs. time data were derived from the original temperature vs. time curves of the referenced Patent for various heat fluxes in a fire. Temperatures were changed to equivalent dial readings by means of the relations shown in FIG. 6 and 7.

When the hybrid heat flux indicator has been exposed in a fire and cooled enough to handle, a dial reading is taken. The dial is next removed and tested for Rockwell "C" hardness, and then replaced with a new dial, the Nitinol strip should be straightened with heat from a match, as described before. On the chart of FIG. 5, or one for the proper receiver thickness, one finds the intersection of the curve for the dial reading (broken line) and the horizontal (solid) hardness line. An interpolation can be made to obtain the heat flux in CAL/cm² sec in the family of heat flux curves. Vertically below the intersection point is the exposure time.

In this instrument only one heat receiver dial is necessary in contrast to both the "HI-FI" device of the patent and the differential Nitinol instruments. However, it is of advantage usually to have two or more different thickness receiver dials per instrument so that a wider range of heat fluxes and times can be accommodated. As is obvious from FIG. 5, very good spread of curves and sensitivity is a characteristic of the hybrid instrument.

While it is true that the necessity for a hardness test is an inconvenience somewhat out of the ordinary, this is not too difficult to remedy, especially if a fairly large amount of fire testing is to be done. If a metallurgical laboratory or a heat treating shop with a standard Rockwell hardness tester is not available, a small portable tester such as the Ames Hardness Tester can be purchased for under $500. With a little practice and reasonable care, accurate, fast measurements can be made by anyone, even out in the field.

Perhaps it also should be pointed out that the instrument described by Ono — the one that uses temperature indicating tabs — could be made to operate like the hybrid indicator by merely using a hardened steel receiver disc in conjunction with the tabs. It is not difficult or expensive to provide a supply of new hardened steel heat receivers and tabs.

These non-electric, passive, heat flux indicators are rugged, inexpensive and easy to use in situations where semi-quantitative data in large amounts are needed. They have been found useful in flame weapons research, forest fire research, and also structure fires research.

What is claimed:

1. A pyrometric device comprising:
a heat sink in the form of a solid metal block;
at least two heat receiver means each in the form of a flat disc;
said heat receiver means each being connected to said heat sink by a strip of material which may be deformed from an original shape to a deformed shape and retained at said deformed shape at ordinary temperatures but which will return to the original shape when subjected to a predetermined transformation temperature; and a container of insulative material covering all of the components except for faces of said heat receiver means remote from said heat sink so that said strips are progressively heated from said heat receiving means toward said heat sink and are thus induced to return toward said original shape in proportion to the heat encountered by said receiver means.

2. The device of claim 1 comprising two heat receivers of fully hardened spring steel and said heat receivers being of differing thicknesses.

3. The device of claim 2:
wherein said strips are a nickel-titanium alloy consisting of 55% by weight of nickel and 45% by weight of titanium.

4. The device of claim 2;
wherein said strip of material consists of an alloy of nickel and titanium.

5. The device of claim 1;
wherein said strip of material consists of an alloy of nickel and titanium.

6. The device of claim 5:
wherein said strip of material is an alloy of 55 weight percent nickel and 45 weight percent titanium.

7. A pyrometric device comprising:
a heat sink in the form of a solid metal block;
at least one heat receiver spaced from said heat sink;
said heat receiver being of fully hardened spring steel;
a strip of NiTi alloy fastened to said heat sink and said heat receiver;
said strip being deformable from an original shape to a deformed shape and retaining said deformed shape at room temperatures but returning to the original shape when subjected to a predetermined transformation temperature.

* * * * *